Patented Feb. 28, 1939

2,149,211

UNITED STATES PATENT OFFICE 2,149,211

COLORED RUBBER PRODUCTS AND A PROCESS OF PRODUCING THEM

Ernst Fischer, Offenbach-on-the-Main, Germany, assignor to General Aniline Works, Inc., New York, N. Y., a corporation of Delaware No Drawing. Application July 23, 1936, Serial No. 92,253. In Germany July 26, 1935

7 Claims. (Cl. 18—50)

The present invention relates to colored rubber products and to a process of producing them.

I have found that rubber products (which term is meant to include natural rubber as well as the synthetic products which have a constitution and properties similar to those of natural rubber, as for example polymerization products of butadiene hydrocarbons such as butadiene or isoprene) can be colored clear violet to blue shades having very good fastness properties by incorporating with the rubber products or mixtures containing them, prior to vulcanization, water-insoluble mono-azo-dyestuffs of the general formula:

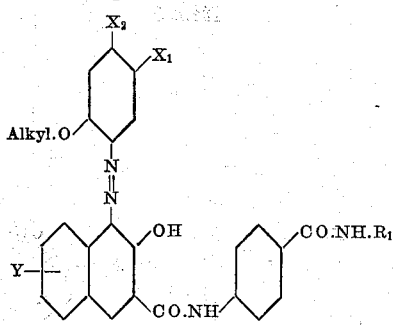

wherein $R_1$ stands for a member of the group consisting of hydrogen, alkyl, benzyl, a radical of the benzene and naphthalene series and a hydroaromatic radical, Y for a member of the group consisting of hydrogen, halogen and alkoxy, $X_1$ for a member of the group consisting of hydrogen, alkyl, alkoxy and the group —NH.CO.$R_2$, $X_2$ for a member of the group consisting of alkoxy and the group —NH.CO.$R_2$, always one of the two substituents $X_1$ and $X_2$ being the group —NH.CO.$R_2$, and wherein $R_2$ stands for a member of the group consisting of alkyl, benzyl, a radical of the benzene and naphthalene series and a hydroaromatic radical.

The dyestuffs are adapted for the different kinds of hot and cold vulcanization processes. By reason of the said dyestuffs being practically insoluble in rubber, they do not bleed when the rubber products are worked up; neither do they give rise to that phenomenon which is known as blushing or efflorescence when the rubber articles are stored. Furthermore, they are insoluble in benzine which renders them especially suitable also for being used in connection with cold vulcanization processes which are advantageously carried out in the presence of benzine. Especially with regard to the non-bleeding into white rubber they are distinctly superior to the dyestuffs disclosed in German Patent No. 601,254.

For coloring rubber products blue and violet shades having good fastness properties there could hitherto be used only the disazo-dyestuffs described in German Patent No. 604,299. The possibility of obtaining the same effects by means of mono-azo-dyestuffs constitutes a valuable advance in the art, since monoazo-dyestuffs can be prepared on a technical scale with greater certainty in a uniform manner which guarantees the valuable properties of the dyeings.

The following examples serve to illustrate the invention, but they are not intended to limit it thereto; the parts are by weight:

(1) A rubber mixture is prepared from 100 parts of crepe rubber, 1 part of stearic acid, 2.6 parts of sulfur, 5 parts of zinc white, 1 part of mercapto-benzothiazol, 0.2 part of hexamethylenetetramine, 60 parts of calcium carbonate, 0.6 part of ozocerite, 10 parts of lithopone, 5 parts of titanium dioxide, and 2 parts of the dyestuff obtainable by coupling diazotized 1-amino-2.5-diethoxy-4-benzoylaminobenzene with 2.3-hydroxy-naphthoyl-1'-amino-benzene-4'-(carbonyl-1''-amino-2''.5''-dimethoxybenzene). The mixture is vulcanized in a vulcanization press for 12 minutes at a steam pressure of 3 atmospheres above atmospheric pressure. There is obtained a blue vulcanizate of very good properties of fastness.

(2) A rubber mixture is prepared in the usual manner from crepe rubber, the usual admixtures and 2 parts of the dyestuff obtainable by coupling diazotized 1-amino-2-methoxy-5-methyl- 4-benzoylaminobenzene with 2.3-hydroxynaphthoyl-1'-aminobenzene - 4' - carbonylaminobenzene. The mixture is vulcanized in the cold by immersing it for 8 seconds in a solution of 3 parts of sulfur chloride in 97 parts of benzine. There is obtained a violet vulcanizate which is, as to its fastness properties, very similar to that described in Example (1).

The following table illustrates a series of dyestuffs which may be substituted for those of Examples 1 and 2 and which dye the vulcanizates very fast tints.

Dyestuff from:

*Item 8*

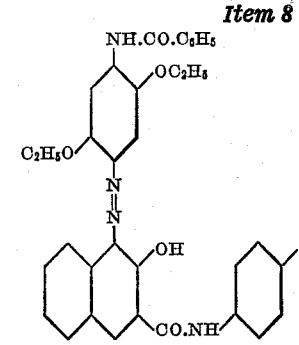

| | Diazo compound of— | Coupled with— | Shade |
|---|---|---|---|
| 1 | 1-amino-2,5-diethoxy-4-phenacetylaminobenzene | 2,3-hydroxynaphthoyl-1'-aminobenzene- -4'-(carbonyl-1''-amino-2''-methyl-4''-chlorobenzene) | Blue. |
| 2 | 1-amino-2-methoxy-4-acetaminobenzene | -4'-carbonylamino-benzene | Violet. |
| 3 | 1-amino-2,5-diethoxy-4-hexahydrobenzoylaminobenzene | do | Reddish blue. |
| 4 | 1-amino-2,5-diethoxy-4-benzoylaminobenzene | -4'-carboxylic acid amide | Do. |
| 5 | do | -4'-carboxylic acid ethyl amide | Do. |
| 6 | do | -4'-carboxylic acid methyl amide | Do. |
| 7 | do | -4'-carboxylic acid benzyl-amide | Blue. |
| 8 | do | -4'-carboxylic acid cyclohexylamide | Do. |
| 9 | do | -4'-(carbonyl-2''-amino-1'', 2'', 3'', 4''-tetrahydronaphthalene). | Reddish blue. |
| 10 | do | -4'-carbonylaminobenzene | Blue. |
| 11 | 1-amino-2,5-dimethoxy-4-benzoylaminobenzene | do | Reddish blue. |
| 12 | 1-amino-2,4-dimethoxy-5-benzoylaminobenzene | do | Violet. |
| 13 | 1-amino-2,4-diethoxy-5-benzoylaminobenzene | do | Do. |
| 14 | 1-amino-2,5-diethoxy-4-benzoylaminobenzene | -4'-(carbonyl-1''-amino-2'', 4''-dichlorobenzene) | Blue. |
| 15 | do | -4'-(carbonyl-1''-amino-2''-methyl-3''-chlorobenzene) | Do. |
| 16 | do | -4'-(carbonyl-1''-amino-2''-chlorobenzene) | Do. |
| 17 | do | -4'-(carbonyl-1''-amino-4''-chlorobenzene) | Do. |
| 18 | do | -4'-(carbonyl-1''-amino-4''-methoxybenzene) | Do. |
| 19 | do | -4'-(carbonyl-2''-amino-naphthalene) | Do. |
| 20 | 1-amino-2-methoxy-5-methyl-4-benzoylaminobenzene | -4'-(carbonyl-1''-amino-2''-chlorobenzene) | Violet. |
| 21 | 1-amino-2,5-dimethoxy-4-benzoylaminobenzene | -4'-carboxylic acid-cyclohexylamide | Reddish blue. |
| 22 | 1-amino-2,5-diethoxy-4-(2'-methoxy-) benzoylaminobenzene | -4'-carboxylic acid amide | Violet. |
| 23 | 1-amino-2,5-diethoxy-4-(2'-chloro-) benzoylaminobenzene | -4'-(carbonyl-1''-amino-2''-chlorobenzene) | Reddish blue. |
| 24 | 1-amino-2,5-diethoxy-4-(4'-ethoxy-) benzoylaminobenzene | -4'-(carbonyl-1''-amino-2''-chlorobenzene) | Violet. |
| 25 | 1-amino-2,5-diethoxy-4-(3'-methyl-) benzoylaminobenzene | -4'-carbonylaminobenzene | Reddish blue. |
| 26 | 1-amino-2,5-diethoxy-4-(2'-naphthoyl-) aminobenzene | -4'-carboxylic acid benzylamide | Blue. |
| 27 | 1-amino-2,5-diethoxy-4-benzoylaminobenzene | 6-bromo-2,3-hydroxynaphthoyl-1'-aminobenzene-4'-carbonyl-aminobenzene | Reddish blue.; |
| 28 | do | 6-methoxy-2,3-hydroxy-naphthoyl-1'-aminobenzene-4'-(carbonyl-1''-amino-2''-methoxybenzene) | Blue. |

For the purpose of clarity some of the dyestuffs described in the foregoing table are set forth in structural formulae:

*Item 1*

*Item 9*

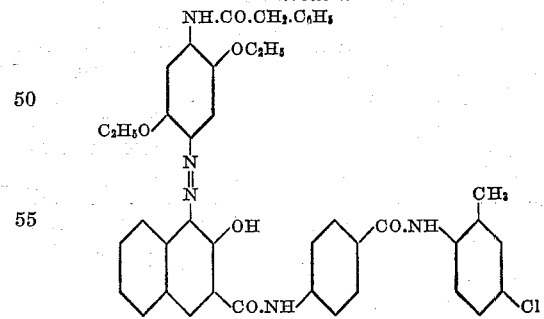

*Item 3*

*Item 22*

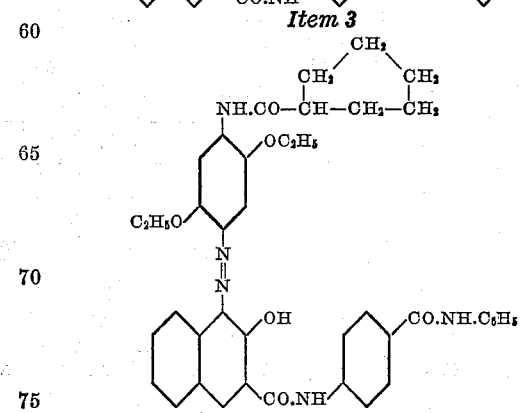

*Item 26*

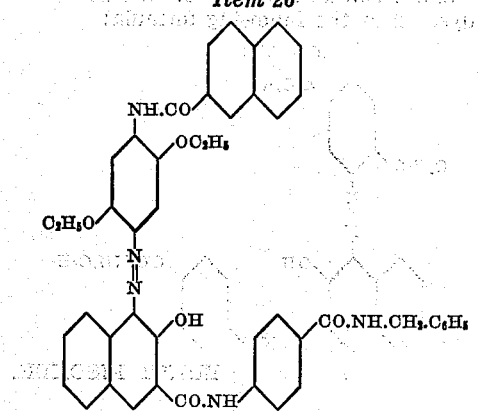

I claim:

1. The process of producing rubber products which are colored blue to violet shades which comprises mixing a rubber product with a water-insoluble mono-azo-dyestuff corresponding to the following general formula:

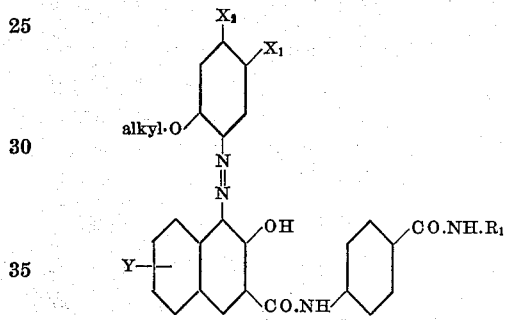

wherein $R_1$ stands for a member of the group consisting of hydrogen, alkyl, benzyl, a radical of the benzene and naphthalene series and a hydroaromatic radical, Y for a member of the group consisting of hydrogen, halogen and alkoxy, $X_1$ for a member of the group consisting of hydrogen, alkyl, alkoxy and the group —NH.CO.$R_2$, $X_2$ for a member of the group consisting of alkoxy and the group —NH.CO.$R_2$, always one of the two substituents $X_1$ and $X_2$ being the group

—NH.CO.$R_2$, and wherein $R_2$ stands for a member of the group consisting of alkyl, benzyl, a radical of the benzene and naphthalene series and a hydroaromatic radical, and then vulcanizing the mixture.

2. The process of producing rubber products which are colored blue to violet shades which comprises mixing a rubber product with a water-insoluble mono-azo-dyestuff corresponding to the following general formula:

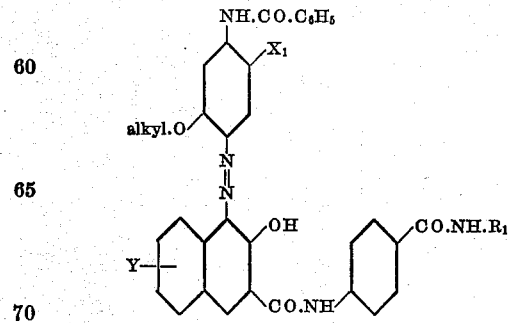

wherein $R_1$ stands for a member of the group consisting of hydrogen, alkyl, benzyl, a radical of the benzene and naphthalene series and a hydroaromatic radical, Y for a member of the group consisting of hydrogen, halogen and alkoxy, and $X_1$ for a member of the group consisting of hydrogen, alkyl and alkoxy, and then vulcanizing the mixture.

3. Rubber products which are colored blue to violet shades containing a water-insoluble mono-azo-dyestuff of the following general formula:

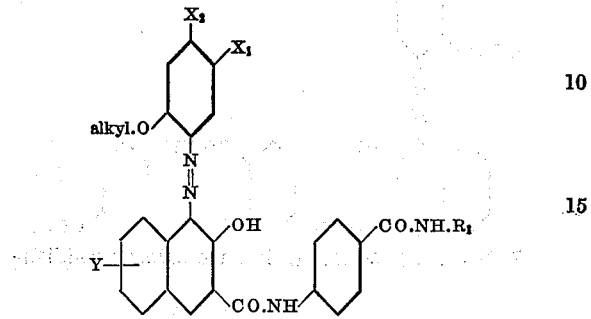

wherein $R_1$ stands for a member of the group consisting of hydrogen, alkyl, benzyl, a radical of the benzene and naphthalene series and a hydroaromatic radical, Y for a member of the group consisting of hydrogen, halogen and alkoxy, $X_1$ for a member of the group consisting of hydrogen, alkyl, alkoxy and the group —NH.CO.$R_2$, $X_2$ for a member of the group consisting of alkoxy and the group —NH.CO.$R_2$, always one of the two substituents $X_1$ and $X_2$ being the group

—NH.CO.$R_2$, and wherein $R_2$ stands for a member of the group consisting of alkyl, benzyl, a radical of the benzene and naphthalene series and a hydroaromatic radical.

4. Rubber products which are colored blue to violet shades containing a water-insoluble mono-azo-dyestuff of the following formula:

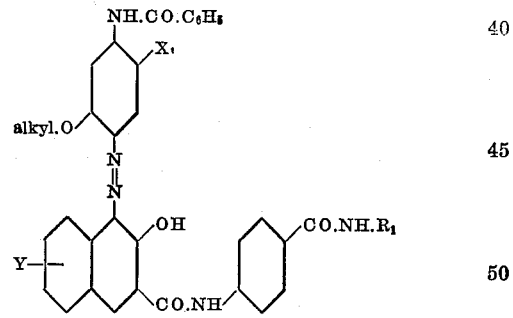

wherein $R_1$ stands for a member of the group consisting of hydrogen, alkyl, benzyl, a radical of the benzene and naphthalene series and a hydroaromatic radical, Y for a member of the group consisting of hydrogen, halogen and alkoxy, and $X_1$ for a member of the group consisting of hydrogen, alkyl and alkoxy.

5. Rubber products which are colored violet shades containing a water-insoluble mono-azo-dyestuff of the following formula:

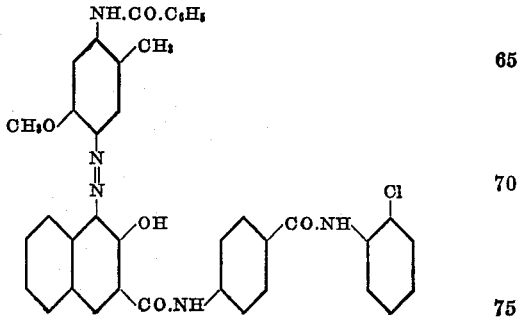

6. Rubber products which are colored blue shades containing a water-insoluble mono-azo-dyestuff of the following formula:
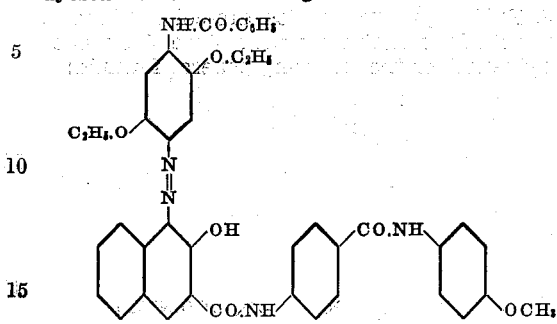
7. Rubber products which are colored reddish-blue shades containing a water-insoluble mono-azo-dyestuff of the following formula:
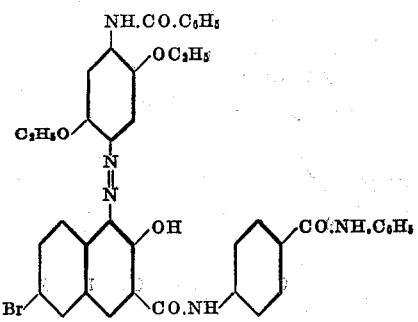
ERNST FISCHER.